US012060988B1

(12) United States Patent
Chen et al.

(10) Patent No.: US 12,060,988 B1
(45) Date of Patent: Aug. 13, 2024

(54) REINFORCED WATERPROOF OUTDOOR LAMP

(71) Applicant: Dongguan Shande Technology Co., Ltd., Dongguan (CN)

(72) Inventors: Xiaoke Chen, Dongguan (CN); Zicong Shao, Dongguan (CN)

(73) Assignee: Dongguan Shand e Technology Co., Ltd., Dongguan (CN)

( * ) Notice: Subject to any disclaimer, the term of this patent is extended or adjusted under 35 U.S.C. 154(b) by 0 days.

(21) Appl. No.: 18/447,905

(22) Filed: Aug. 10, 2023

(30) Foreign Application Priority Data

Jul. 25, 2023 (CN) ......................... 202321978615.2

(51) Int. Cl.
*F21V 23/06* (2006.01)
*F21V 31/00* (2006.01)

(52) U.S. Cl.
CPC ............ *F21V 23/06* (2013.01); *F21V 31/005* (2013.01)

(58) Field of Classification Search
CPC ............................... F21V 23/06; F21V 31/005
See application file for complete search history.

(56) References Cited

U.S. PATENT DOCUMENTS 10,753,595 B1 * 8/2020 Wan .......................... F21V 3/02
11,125,430 B1 * 9/2021 Wu ......................... F21V 17/12
11,199,314 B1 * 12/2021 Wu ........................... F21V 3/00
11,231,172 B1 * 1/2022 Wu ......................... F21K 9/238
11,346,509 B1 * 5/2022 Wu ....................... F21V 31/005
2017/0336063 A1 * 11/2017 Leung ....................... F21V 3/00
2021/0356110 A1 * 11/2021 Zhang ..................... F21V 29/58

FOREIGN PATENT DOCUMENTS

CN 207438200 U 6/2018
CN 207584605 U 7/2018
CN 216480518 U 5/2022

* cited by examiner

*Primary Examiner* — Tsion Tumebo

(57) ABSTRACT

A reinforced waterproof outdoor lamp, including a first electric conductor, a second electric conductor, a light emitting source, a waterproof plug, a lamp holder, a lamp housing and waterproof glue. The waterproof plug is formed on the first electric conductor and the second electric conductor by means of a mold through plastic filling or injection molding.

10 Claims, 3 Drawing Sheets

REINFORCED WATERPROOF OUTDOOR LAMP

CROSS-REFERENCE TO RELATED APPLICATIONS

The application claims priority to Chinese patent application No. 2023219786152, filed on Jul. 25, 2023, the entire contents of which are incorporated herein by reference.

TECHNICAL FIELD

The present application relates to the technical field of lamps, in particular to a reinforced waterproof outdoor lamp.

BACKGROUND

At present, an outdoor lamp, just as the name implies, is an illumination lamp exposed outdoors, and can usually be combined with surrounding roads, landscapes and buildings for light design and mounting. The traditional outdoor lamp includes a lamp housing, a lamp holder and a light module, and the lamp housing covers the light module to be connected to the lamp holder. However, such outdoor lamp may generate heat when being lightened, the air pressure in the lamp housing may increase, the air may be exhausted from a gap, after being powered off, the outdoor lamp is cooled, the interior of the lamp housing may be in an atmospheric negative pressure state, water vapor in the air may be sucked into the lamp housing due to a siphon phenomenon, thus the outdoor lamp is not waterproof, and the service life is short.

SUMMARY

The present application aims to solve the problems in the prior art, and provides a reinforced waterproof outdoor lamp.

In order to achieve the above-mentioned purpose, the following solution is adopted for the present application:

the reinforced waterproof outdoor lamp comprises a first electric conductor, a second electric conductor and a light emitting source, wherein the first electric conductor and the second electric conductor are arranged side by side in a spaced manner and are both connected to the light emitting source; and the reinforced waterproof outdoor lamp further comprises:

a waterproof plug which is formed on the first electric conductor and the second electric conductor by means of a mold through plastic filling or injection molding, a lower end of the first electric conductor and a lower end of the second electric conductor both extending to penetrate through a bottom end surface of the waterproof plug;

a lamp holder which has a mounting embedding groove adapted to a lower end of the waterproof plug for mounting, the lower end of the first electric conductor and the lower end of the second electric conductor being electrically connected to the lamp holder respectively when the lower end of the waterproof plug is embedded in the mounting embedding groove in an adapted manner;

a lamp housing which covers an upper end of the first electric conductor, an upper end of the second electric conductor and the light emitting source, a lower end of the lamp housing being sleeved on an upper end of the waterproof plug in an adapted manner and being connected to the lamp holder; and waterproof glue which fills a connection gap between the lower end of the lamp housing and the upper end of the waterproof plug and a connection gap between the lower end of the waterproof plug and the mounting embedding groove.

Further, the lower end of the lamp housing is in threaded connection or riveted connection with the lamp holder.

Further, the lamp holder comprises an electrically-conductive housing and a positive electrode portion; the positive electrode portion is arranged at a bottom end of the electrically-conductive housing; the mounting embedding groove is located on the electrically-conductive housing; the electrically-conductive housing is a negative electrode portion; the lower end of the first electric conductor penetrates through the lamp holder from a groove bottom of the mounting embedding groove to be electrically connected to the positive electrode portion; the lower end of the second electric conductor is bent to be close to an outer side wall of the lower end of the waterproof plug; and when the lower end of the waterproof plug is embedded in the mounting embedding groove in the adapted manner, the lower end of the second electric conductor is closely attached to and electrically connected to the electrically-conductive housing.

Further, the lower end of the first electric conductor is electrically connected to the positive electrode portion by means of soldering tin or a rivet.

Further, the waterproof plug comprises a cylindrical plug and an inverted-cone-shaped plug; a lower end of the cylindrical plug is connected to the inverted-cone-shaped plug; the lower end of the second electric conductor is bent to be close to an outer side wall of the inverted-cone-shaped plug; and after the lower end of the lamp housing is connected to the lamp holder, the lower end of the lamp housing tightly presses the inverted-cone-shaped plug to enable the lower end of the second electric conductor to be closely attached to and electrically connected to the electrically-conductive housing.

Further, the diameter of atop end of the inverted-cone-shaped plug is greater than that of the cylindrical plug.

Further, the inverted-cone-shaped plug is connected to the mounting embedding groove in an interference fit manner; and the lower end of the lamp housing is connected to the cylindrical plug in an interference fit manner.

Further, the cylindrical plug is in a cylindrical shape.

Compared with the prior art, the present application has the following advantages:

with regard to the present application, on the basis of the first electric conductor, the second electric conductor and the light emitting source, the waterproof plug capable of being sleeved on the first electric conductor and the second electric conductor is formed in the mold through injection molding of injection molding plastic, the waterproof plug is non-removable from the first electric conductor and the second electric conductor, thus the structure is stable, falling does not occur easily, and the sealing and waterproof effect is good; and then the waterproof plug, the lamp holder, the lamp housing and the waterproof glue are combined to form multiple waterproof sealed connection, the waterproof performance of the reinforced waterproof outdoor lamp can be improved, and the problem that no siphon phenomenon occurs in the outdoor lamp in a power-off cooling state to prevent water vapor in the air from entering the lamp housing and the lamp holder is solved, thereby effectively enhancing the waterproof effect of the outdoor lamp, prolonging the service life of the outdoor lamp, and facilitating the market promotion.

BRIEF DESCRIPTION OF DRAWINGS

The present application is further described in detail below in combination with the accompanying drawings and particular embodiments.

In the drawings.

Figure 1:
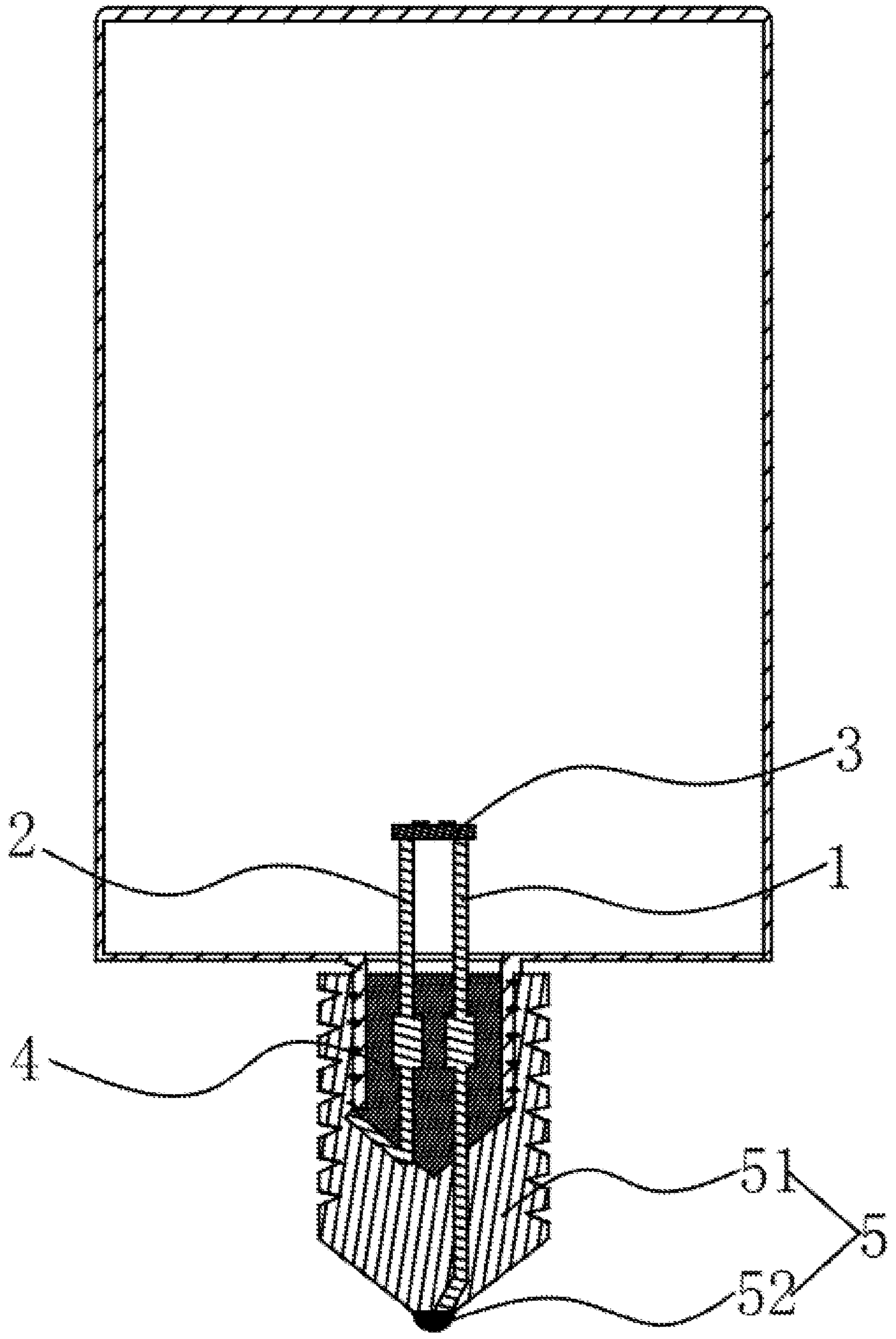
FIG. 1 is a sectional structure diagram of a reinforced waterproof outdoor lamp of the present application.

first electric conductor 1, second electric conductor 2, light emitting source 3, waterproof plug 4, cylindrical plug 41, inverted-cone-shaped plug 42, lamp holder 5, electrically-conductive housing 51, positive electrode portion 52, mounting embedding groove 53, and lamp housing 6.

DETAILED DESCRIPTION OF THE EMBODIMENTS

The implementation of the present application is further described in detail below in combination with the accompanying drawings and embodiments.

Figure 2:
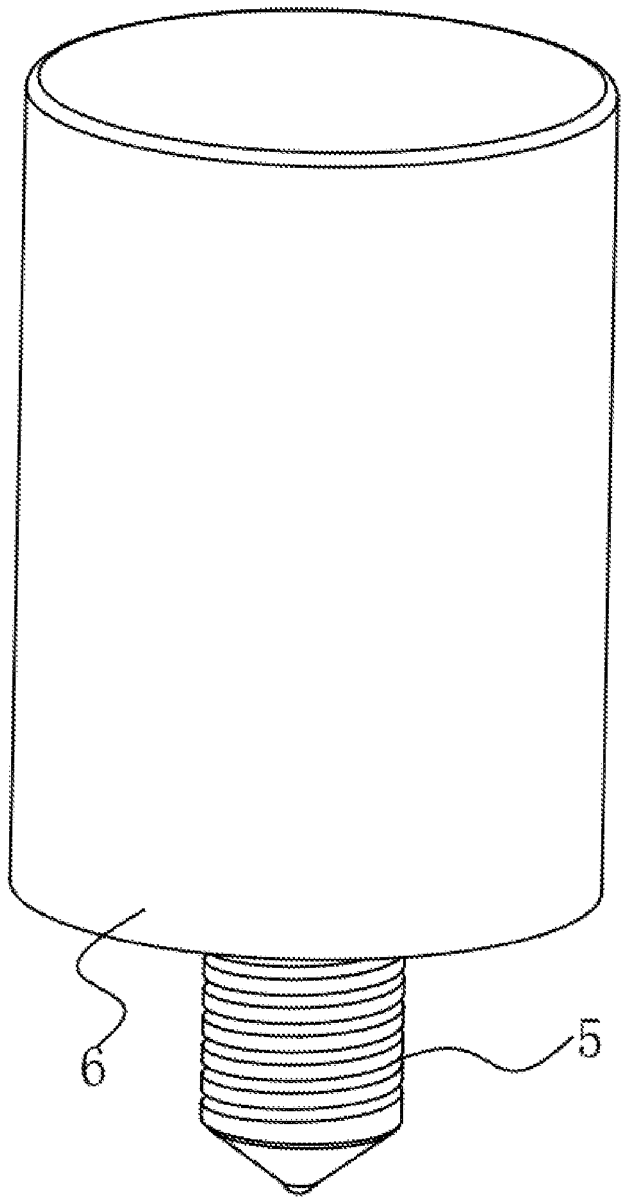
FIG. 2 is a three-dimensional structure diagram of the reinforced waterproof outdoor lamp of the present application.
Figure 3:
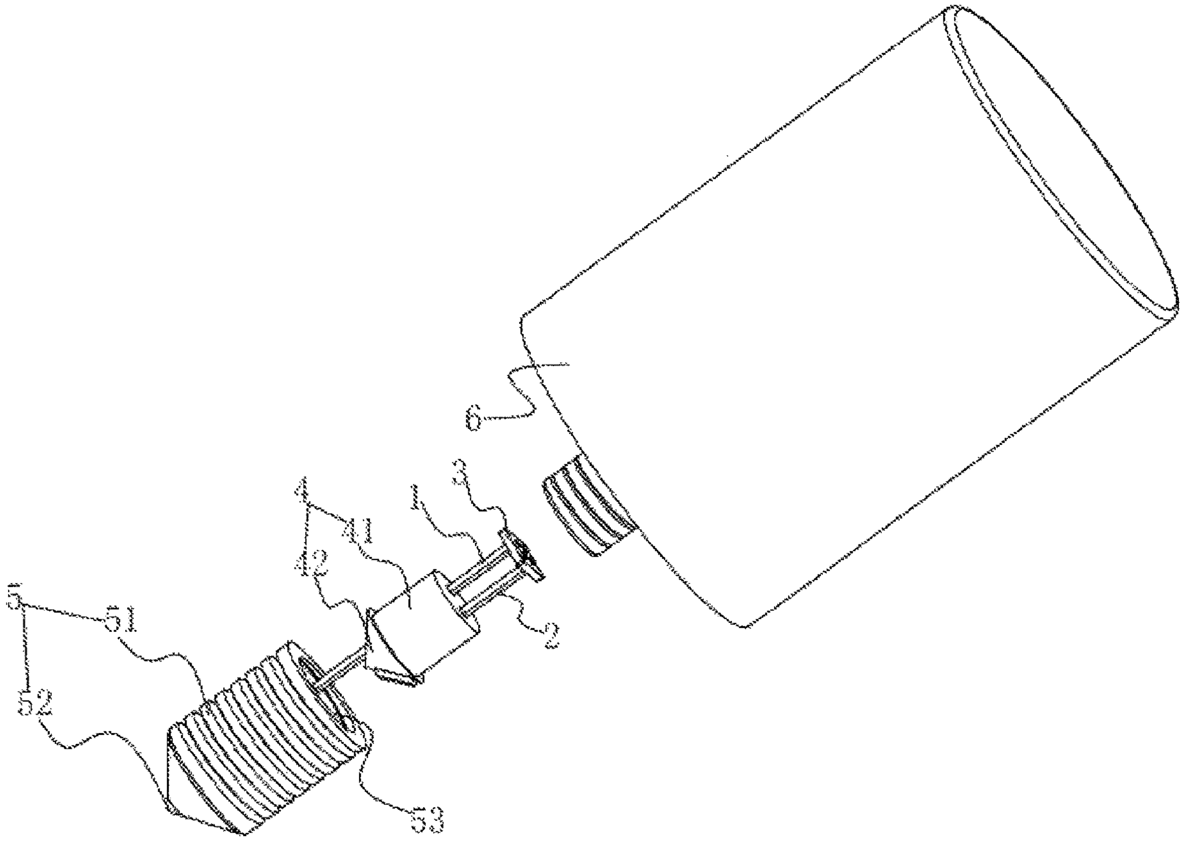
FIG. 3 is an exploded three-dimensional structure diagram of the reinforced waterproof outdoor lamp of the present application.

As shown in FIGS. 1-3, a reinforced waterproof outdoor lamp includes a first electric conductor 1, a second electric conductor 2 and a light emitting source 3, wherein the first electric conductor 1 and the second electric conductor 2 are arranged side by side in a spaced manner and are both connected to the light emitting source 3; and the reinforced waterproof outdoor lamp further includes a waterproof plug 4, a lamp holder 5, a lamp housing 6 and waterproof glue. The waterproof plug 4 is formed on the first electric conductor 1 and the second electric conductor 2 by means of a mold through plastic filling or injection molding; and injection molding plastic used for plastic filling or injection molding is made of common waterproof plastic in the market. A lower end of the first electric conductor 1 and a lower end of the second electric conductor 2 both extend to penetrate through a bottom end surface of the waterproof plug 4. The lamp holder 5 has a mounting embedding groove 53 adapted to a lower end of the waterproof plug 4 for mounting, and the lower end of the first electric conductor 1 and the lower end of the second electric conductor 2 are electrically connected to the lamp holder 5 respectively when the lower end of the waterproof plug 4 is embedded in the mounting embedding groove 53 in an adapted manner. The lamp housing 6 covers an upper end of the first electric conductor 1, an upper end of the second electric conductor 2 and the light emitting source 3, and a lower end of the lamp housing 6 is sleeved on an upper end of the waterproof plug 4 in an adapted manner and is connected to the lamp holder 5. The waterproof glue fills a connection gap between the lower end of the lamp housing 6 and the upper end of the waterproof plug 4 and a connection gap between the lower end of the waterproof plug 4 and the mounting embedding groove 53. The shape of the lamp housing 6 is not limited, and may be any shape.

The first electric conductor 1 and the second electric conductor 2 are first arranged side by side in the spaced manner and are both connected to the light emitting source 3, then the waterproof plug 4 capable of being sleeved on the first electric conductor 1 and the second electric conductor 2 is formed in the mold through injection molding of the injection molding plastic, the waterproof plug 4 is non-removable from the first electric conductor 1 and the second electric conductor 2, thus the structure is stable, falling does not occur easily, and the sealing and waterproof effect is good; then the lower end of the lamp housing 6 is sleeved on the upper end of the waterproof plug 4 in the adapted manner, the lower end of the waterproof plug 4 is embedded in the mounting embedding groove 53 in the adapted manner, and under the action of the waterproof plug 4, a first waterproof seal is formed for the reinforced waterproof outdoor lamp; then the waterproof glue fills the connection gap between the lower end of the lamp housing 6 and the upper end of the waterproof plug 4 and the connection gap between the lower end of the waterproof plug 4 and the mounting embedding groove 53, and a second waterproof seal is formed at the arrangement positions of the waterproof glue; finally, the lower end of the lamp housing 6 is connected to the lamp holder 5, the lamp housing 6 presses the waterproof plug 4 to be tightly embedded in the lamp holder 5, and a third waterproof seal is formed; and by means of multiple waterproof sealed connection, the waterproof performance of the reinforced waterproof outdoor lamp can be improved, and the problem that no siphon phenomenon occurs in the outdoor lamp in a power-off cooling state to prevent water vapor in the air from entering the lamp housing 6 and the lamp holder 5 is solved, thereby effectively enhancing the waterproof effect of the outdoor lamp, prolonging the service life of the outdoor lamp, and facilitating the market promotion.

In order to enhance the stable connection between the lamp housing 6 and the lamp holder 5 and achieve the good waterproof effect, the lower end of the lamp housing 6 is in threaded connection or riveted connection with the lamp holder 5.

In this embodiment, the lamp holder 5 includes an electrically-conductive housing 51 and a positive electrode portion 52; the positive electrode portion 52 is arranged at a bottom end of the electrically-conductive housing 51; the mounting embedding groove 53 is located on the electrically-conductive housing 51; the electrically-conductive housing 51 is a negative electrode portion; the lower end of the first electric conductor 1 penetrates through the lamp holder 5 from a groove bottom of the mounting embedding groove 53 to be electrically connected to the positive electrode portion 52; and specifically, the lower end of the first electric conductor 1 is electrically connected to the positive electrode portion 52 by means of soldering tin or a rivet. The lower end of the second electric conductor 2 is bent to be close to an outer side wall of the lower end of the waterproof plug 4; and when the lower end of the waterproof plug 4 is embedded in the mounting embedding groove 53 in the adapted manner, the lower end of the second electric conductor 2 is closely attached to and electrically connected to the electrically-conductive housing 51, thereby increasing the contact with the electrically-conductive housing 51, improving the electrical conductivity, and forming a negative-electrode electrically-conductive structure. By means of the structural arrangement of the first electric conductor 1 and the second electric conductor 2, the electrically conductive effect is improved, and the electrical connection between the first electric conductor 1 and the positive electrode portion 52 and between the second electric conductor 2 and the negative electrode portion is achieved.

In this embodiment, the waterproof plug 4 includes a cylindrical plug 41 and an inverted-cone-shaped plug 42; and the cylindrical plug 41 is in a cylindrical shape, which is simple in structure and convenient to mount. A lower end of the cylindrical plug 41 is connected to the inverted-cone-shaped plug 42; the lower end of the second electric conductor 2 is bent to be close to an outer side wall of the inverted-cone-shaped plug; and after the lower end of the lamp housing 6 is connected to the lamp holder 5, the lower end of the lamp housing 6 tightly presses the inverted-cone-shaped plug 42 to enable the lower end of the second electric conductor 2 to be closely attached to and electrically connected to the electrically-conductive housing 51. Preferably, the diameter of a top end of the inverted-cone-shaped plug 42 is greater than that of the cylindrical plug 41. The inverted-cone-shaped plug 42 is connected to the mounting embedding groove 53 in an interference fit manner; and the lower end of the lamp housing 6 is connected to the cylindrical plug 41 in an interference fit manner. By means of such arrangement, the cylindrical plug 41 and the inverted-cone-shaped plug 42 form the waterproof plug 4, the lamp holder 5, the waterproof plug 4 and the lamp housing 6 can form the good waterproof seal, and the problem that no siphon phenomenon occurs in the outdoor lamp in the power-off cooling state to prevent the water vapor in the air from entering the lamp housing 6 and the lamp holder 5 is solved, thereby effectively enhancing the waterproof effect of the outdoor lamp.

An assembly principle of the present application is as follows:

the first electric conductor 1 and the second electric conductor 2 are first arranged side by side in the spaced manner and are both connected to the light emitting source 3, and then the waterproof plug 4 capable of being sleeved on the first electric conductor 1 and the second electric conductor 2 is formed in the mold through injection molding of the injection molding plastic;

then the lower end of the second electric conductor 2 is bent to be close to the outer side wall of the lower end of the waterproof plug 4, the lower end of the lamp housing 6 is sleeved on the upper end of the waterproof plug 4 in the adapted manner, and the lower end of the waterproof plug 4 is embedded in the mounting embedding groove 53 in the adapted manner; the lower end of the first electric conductor 1 penetrates through the lamp holder 5 from the groove bottom of the mounting embedding groove 53 to be electrically connected to the positive electrode portion 52, and when the lower end of the waterproof plug 4 is embedded in the mounting embedding groove 53 in the adapted manner, the lower end of the second electric conductor 2 is closely attached to and electrically connected to the electrically-conductive housing 51;

then the waterproof glue fills the connection gap between the lower end of the lamp housing 6 and the upper end of the waterproof plug 4 and the connection gap between the lower end of the waterproof plug 4 and the mounting embedding groove 53; and finally, the lower end of the lamp housing 6 is connected to the lamp holder 5, the lamp housing 6 presses the waterproof plug 4 to be tightly embedded in the lamp holder 5, and the lower end of the second electric conductor 2 is further closely attached to and electrically connected to the electrically-conductive housing 51, thereby forming the third waterproof seal, and forming the reinforced waterproof outdoor lamp.

In conclusion, the reinforced waterproof outdoor lamp is provided in the embodiment of the present application. With regard to the reinforced waterproof outdoor lamp, by means of multiple waterproof sealed connection, the waterproof performance of the reinforced waterproof outdoor lamp can be improved, and the problem that no siphon phenomenon occurs in the outdoor lamp in the power-off cooling state to prevent the water vapor in the air from entering the lamp housing 6 and the lamp holder 5 is solved, thereby effectively enhancing the waterproof effect of the outdoor lamp, prolonging the service life of the outdoor lamp, and facilitating the market promotion.

The above description is only the preferred embodiment of the present application. It should be pointed out that those of ordinary skill in the art can also make several improvements and replacements without departing from the technical principle of the present application, and these improvements and replacements should also fall within the scope of protection of the present application.

What is claimed is:

1. A reinforced waterproof outdoor lamp, comprising a first electric conductor, a second electric conductor and a light emitting source, wherein the first electric conductor and the second electric conductor are arranged side by side in a spaced manner and are both connected to the light emitting source; and the reinforced waterproof outdoor lamp further comprises:

a waterproof plug which is formed on the first electric conductor and the second electric conductor by means of a mold through plastic filling or injection molding; wherein the waterproof plug comprises a cylindrical plug and an inverted-cone-shaped plug; a lower end of the cylindrical plug is connected to the inverted-cone-shaped plug; a lower end of the first electric conductor and a lower end of the second electric conductor both extend to penetrate through an outer side wall of the inverted-cone-shaped plug; the lower end of the second electric conductor is bent to fully contact with the outer side wall of the inverted-cone-shaped plug;

a lamp holder which has a mounting embedding groove adapted to a lower end of the waterproof plug for mounting, the lower end of the first electric conductor and the lower end of the second electric conductor being electrically connected to the lamp holder respectively when the lower end of the waterproof plug is embedded in the mounting embedding groove in an adapted manner;

a lamp housing which covers an upper end of the first electric conductor, an upper end of the second electric conductor and the light emitting source, a lower end of the lamp housing being sleeved on an upper end of the waterproof plug in an adapted manner and being connected to the lamp holder; and waterproof glue which fills a connection gap between the lower end of the lamp housing and the upper end of the waterproof plug and a connection gap between the lower end of the waterproof plug and the mounting embedding groove.

2. The reinforced waterproof outdoor lamp according to claim 1, wherein the lower end of the lamp housing is in threaded connection or riveted connection with the lamp holder.

3. The reinforced waterproof outdoor lamp according to claim 1, wherein the lamp holder comprises an electrically-conductive housing and a positive electrode portion; the positive electrode portion is arranged at a bottom end of the electrically-conductive housing; the mounting embedding groove is located on the electrically-conductive housing; the electrically-conductive housing is a negative electrode portion; the lower end of the first electric conductor penetrates through the lamp holder from a groove bottom of the mounting embedding groove to be electrically connected to the positive electrode portion; and when the lower end of the lamp housing is connected to the lamp holder, the lower end of the second electric conductor is closely attached to and electrically connected to the electrically-conductive housing.

4. The reinforced waterproof outdoor lamp according to claim 3, wherein the lower end of the first electric conductor is electrically connected to the positive electrode portion by means of soldering tin or a rivet.

5. The reinforced waterproof outdoor lamp according to claim 3, after the lower end of the lamp housing is connected to the lamp holder, the lower end of the lamp housing tightly presses the inverted-cone-shaped plug to enable the lower end of the second electric conductor to be closely attached to and electrically connected to the electrically-conductive housing.

6. The reinforced waterproof outdoor lamp according to claim 5, wherein a diameter of a top end of the inverted-cone-shaped plug is greater than a diameter of the cylindrical plug.

7. The reinforced waterproof outdoor lamp according to claim 6, wherein the inverted-cone-shaped plug is connected to the mounting embedding groove in an interference fit manner; and the lower end of the lamp housing is connected to the cylindrical plug in an interference fit manner.

8. The reinforced waterproof outdoor lamp according to claim 6, wherein the cylindrical plug is in a cylindrical shape.

9. The reinforced waterproof outdoor lamp according to claim 1, wherein the waterproof plug is non-removable from the first electric conductor and the second electric conductor.

10. The reinforced waterproof outdoor lamp according to claim 1, wherein the cylindrical plug has a continuous side wall.

* * * * *